Figure 1A:
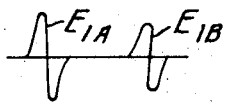

Jan. 7, 1941.  F. H. GULLIKSEN  2,228,079
ANGLE SWITCHING CONTROL
Filed Aug. 18, 1939

WITNESSES:
N. F. Susser.
Wm. J. Ruano

INVENTOR
Finn H. Gulliksen.
BY
Paul E. Friedemann
ATTORNEY

Patented Jan. 7, 1941

2,228,079

UNITED STATES PATENT OFFICE 2,228,079

ANGLE SWITCHING CONTROL

Finn H. Gulliksen, Pittsburgh, Pa., assignor to Westinghouse Electric & Manufacturing Company, East Pittsburgh, Pa., a corporation of Pennsylvania Application August 18, 1939, Serial No. 290,738

8 Claims. (Cl. 171—118)

My invention relates to means for effecting a given relative operating position of two or more shafts which are to operate in synchronism.

More particularly, my invention relates to electric control systems whereby the relative rotor positions at a given instant of two or more electric motors operating in synchronism is effected.

It often happens that the load characteristics, namely, the variations of torque of the load driven by one prime mover has periodic variations. When several such loads are to be coupled to a prime mover, it is desirable that the driven shafts be coupled to the prime mover in such relative angular relation with reference to corresponding planes, including the driven axes, that the peak torques of all the loads do not occur at the same time.

One object of my invention is to provide for driving two or more shafts in synchronism, but in such relative relation that corresponding points on the shafts hold selected positions with reference to corresponding planes including said respective shafts.

The advantages of my invention are particularly noticeable in conjunction with the operation of a plurality of synchronous motor driving loads of varying character, as, for instance, compressors.

Synchronous motors are, as a rule, started as induction motors, and at or near synchronism transferred from induction motor operation to synchronous motor operation. If several synchronous motors are connected to the same source of supply, the desirable starting operation is that all the motors are not synchronized at the same time. Furthermore, if the motors are coupled to loads that vary periodically, it is very desirable that the peak loads on the motors do not occur at the same instant.

For instance, if two or more synchronous motors are to operate compressors, it would not be desirable that the crank arms occupy the same relation during synchronous operation. If the motors could be synchronized so that corresponding poles hold different positions at a given instant during synchronous operation and the torques hold like positions to the poles of each motor, it is apparent that the peak loads for the respective motors would occur at different times.

Experience has shown that when a single electric discharge device is made responsive to the in-phase voltages developed by a pair of peaked waves from generators coupled to the two synchronous motor shafts, great difficulty has been encountered in developing equal peak voltages by the two generators resulting in faulty and unreliable operation of the electric discharge device.

One object of my invention is to so synchronize a plurality of synchronous motors that corresponding pole pieces hold selected positions at a given instant during synchronous operation.

Another object of my invention is to control the successive synchronization of a plurality of motors so that corresponding points on the shafts of the motors hold selected angular positions at a given instant with reference to corresponding planes including the axes of the respective motors.

Another object of my invention is to synchronize a synchronous motor at such an instant that its shaft will hold a given relation to the shaft of another synchronous motor operating at synchronism.

A still further object of my invention is to control the successive synchronization of synchronous motors by electric discharge means that are made responsive to the relative angular disposition of the shafts at a given instant.

Another object of my invention is to provide an improved electronic control system for synchronizing a pair of synchronous motors which will avoid faulty operation inherent in previous electronic discharge control systems and which will be simple and reliable in operation.

Figure 1B:
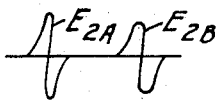
Figure 1C:
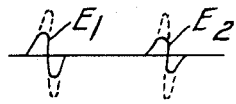
Figure 2:
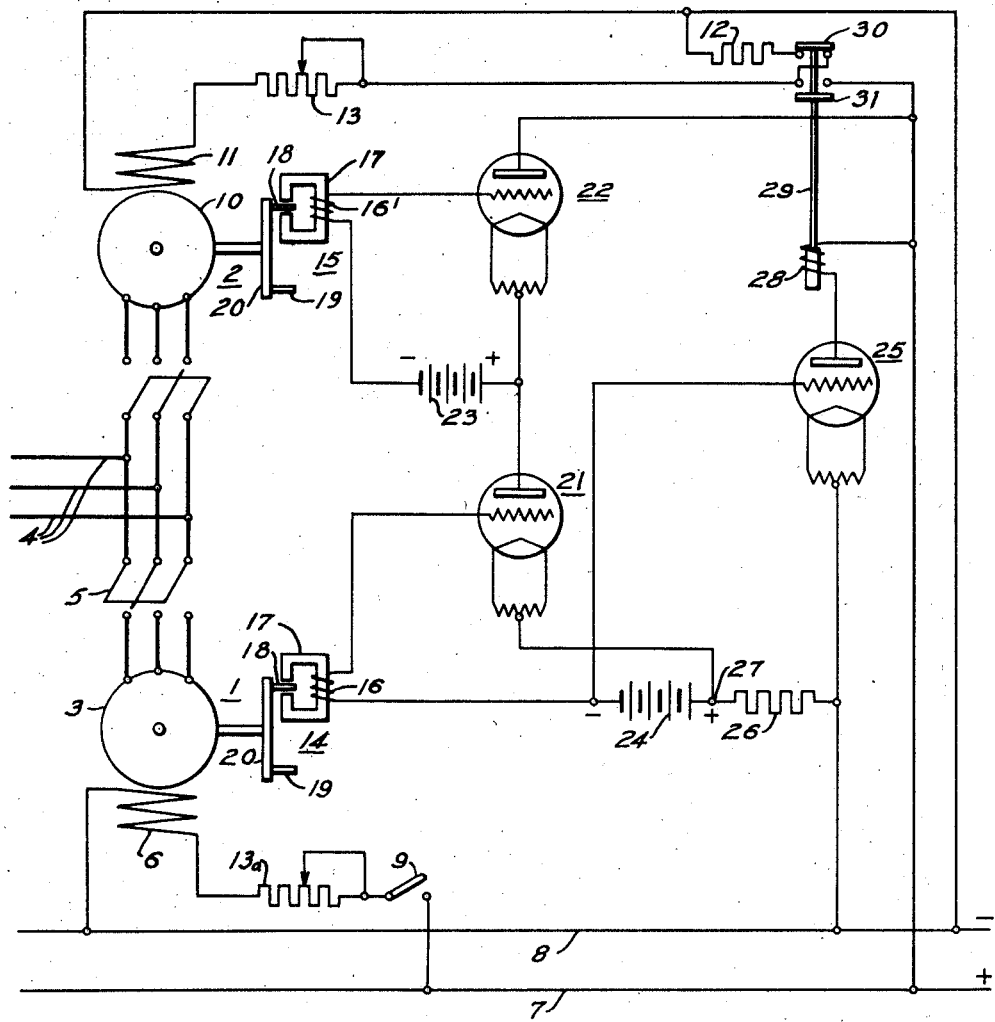

Other objects and advantages of my invention will become more apparent from a study of the following specification when taken in conjunction with the accompanying drawing, in which:

Figures 1a, 1b and 1c are curves showing certain characteristics illustrating the advantages of a control system embodying my invention; and Fig. 2 shows diagrammatically a control scheme for synchronizing a pair of synchronous motors in accordance with my invention.

Referring more particularly to Fig. 2, numerals 1 and 2 denote a pair of synchronous motors. Motor 1 has an armature or stator winding 3 which is supplied by a three-phase alternating-current source indicated by numeral 4 through a three-pole switch 5. Motor 1 has a field winding or rotor winding 6 which is energizable by a direct-current source of supply indicated by conductors 7 and 8, which are, respectively, the positive and negative terminals of the direct-current source. A manually operated switch 9 is shown for connecting the field winding 6 in series with a variable resistor 13a and the direct-current source of supply. While a manual switch 9 is shown for the purpose of simplicity, it is understood that any of the well-known automatic means for connecting field winding 6 to its direct-current energizing source, when motor 1 is brought up to synchronous speed, may be used instead. My invention is directed to synchronizing motor 2 at an instant when its shaft has a predetermined relation with respect to the shaft of synchronous motor 1, in order to avoid simultaneous occurrence of peak loads.

The synchronous motor 2 has an armature or stator winding 10 and a field or rotor winding 11. A discharge resistor 12 normally short circuits field winding 11 through variable resistor 13. Each of the armatures 3 and 10 of synchronous motors 1 and 2, respectively, has an impulse type generator 14 and 15 mechanically coupled thereto, each comprising a pick-up coil, as 16 and 16', which surrounds a leg of a core 17 having an air gap, through which air gap is adapted to move a pair of pins 18 and 19 mounted on a disc 20 spaced 180° apart. For each complete revolution of the disc 20, there will be two peaked voltage impulses afforded by pins 18 and 19 in the pick-up coil 16. A pair of high vacuum tubes 21 and 22 is associated with pick-up coils 16 and 16', respectively. The grid of tube 22 is connected to one terminal of coil 16', and the cathode of tube 22 is connected through a biasing battery 23 to the other terminal. Likewise, the grid of tube 21 is connected to one terminal of coil 16, whereas the cathode thereof is connected through a biasing battery 24 to the other terminal of coil 16.

A thyratron tube 25 is provided and is connected in such a manner that it will become conductive only when tubes 21 and 22 become simultaneously conductive, but will not become conductive when either tube 21 or 22 becomes conductive singly due to the series relationship that exists between tubes 21 and 22 and the insufficiency of the peak voltage of either coil 16 or 16' to effect conduction of tube 25. In other words, while normally a negative bias is maintained on the grid of tube 25 by virtue of resistor 26 and biasing battery 24, upon conduction of both tubes 22 and 21, the positive source of direct-current potential is impressed at point 27, hence making the grid substantially positive, therefore, rendering tube 25 conductive. When the tube 25 becomes conductive, a circuit will be completed from the positive terminal through the actuating coil 28 and through the discharge path of tube 25, thereby actuating relay 29, which, in turn, opens contact members 30 so as to disconnect discharge resistor 12 and close contact members 31, thus completing a circuit from the direct-current source of supply through the field winding 11 and resistor 13 when a desired relationship exists between the shafts of armatures 3 and 10 of the synchronous motors.

While it has been described above that the shafts may be locked together in any angular position, this fact is true only within certain limits inasmuch as the direct angle governs the angular leg in the field pole position behind the axes of the stator rotating field, and this is a function of the load. The system, in effect merely associates a given stator axes with a specific field pole, the actual angle of operation between them being determined by the load and excitation values. There are as many definite angular positions as there are pairs of poles.

It will be apparent that instead of using thyratron tube 25, such tube could be eliminated and relays such as 28 could be operated directly by the series connected output currents of tubes 21 and 22 for connecting the field winding 11 to the direct current source upon attainment of synchronization.

The scheme illustrated in the drawing and in accordance with my invention has outstanding advantages over a scheme wherein it is attempted to use a single electrical discharge device such as 25 omitting discharge devices 21 and 22; in other words, to have the combined output of pick-up coils 16 and 16' operate across a pair of resistors and connecting the output of the series connected resistor across the cathode and grid of a tube such as tube 25. The outstanding difficulty encountered in the latter scheme is to adjust the pins 18 and 19 of the respective generators so that the induced voltage produced by the two pins ($E_{1A}$ and $E_{1B}$, respectively) are equal. This is illustrated in Fig. 1a where $E_{1B}$ is lower than $E_{1A}$, $E_{2B}$ is lower than $E_{2A}$ ($E_{2B}$ and $E_{2A}$ are the voltage produced by the respective pins associated with impulse generator 15). The bias voltage of battery 24 must be adjusted so that tube 25 will not break down for either of voltages $E_{1A}$, $E_{1B}$, $E_{2A}$ and $E_{2B}$ appearing alone in the grid circuit but must break down if $E_{1B}$ and $E_{2B}$ appear simultaneously. Assuming that for the sake of explanation the critical voltage of tube 25 be zero and assuming that a 20 volt margin of grid voltage control is needed, we find that if $E_{1A}$ is the impulse of maximum magnitude, (1) $$E_g \geq E_{1A} + 20$$

and (2) $$E_g \leq E_{1B} + E_{2B} - 20$$

If we assume that $E_{1B} = E_{2B}$ we find—

(3) $$E_g \leq 2E_{1B} - 20$$
(4) $$E_g \geq E_{1A} + 20$$

From these equations will be seen that as the ratio between $E_{1A}$ and $E_{1B}$ is increased, the magnitude of $E_{1A}$ must increase as follows:

$$E_{1A} = \frac{40}{\frac{2}{K} - 1}$$

where K is the ratio $$\frac{E_{1A}}{E_{1B}}$$

If $K=1$ we find $E_{1A}=40$
If $K=1.3$   $E_{1A}=80$

It has been found that the capacity between the leads from the impulse transformers 15 and 16 which are located at the motors, and the control cabinet decreases the magnitude of the impulse voltages as shown in Fig. 1 so that often 40 volts cannot be obtained and 80 volts cannot be obtained.

The device in accordance with my invention wherein tubes 21 and 22 are added, eliminates this disadvantage. Assuming a grid control margin of 20 volts as before, it is evident that $E_{1A}$ needs to be only $K-20$ volts or 20 volts for $K=1$ or 26 volts for $K=1.3$.

I am, of course, aware that others skilled in the art, particularly after having had the benefit of the teachings of my invention may devise other circuit diagrams than the particular diagram I have shown for accomplishing the novel results of my invention. However, I do not wish to be limited to the particular circuit diagrams shown or described but wish to be limited only by the appended claims and the pertinent prior art.

I claim as my invention:

1. In a system of control for a pair of synchronous motors, in combination, a synchronous motor having an armature winding and a field winding, a source of alternating current, means for connecting the armature to the source of alternating current, a source of direct current, means for connecting the field winding to the source of direct current, a second synchronous motor having an armature winding and a field winding, means for connecting the armature winding of the second motor to the source of alternating current, a generator coupled to each of said motors and therefore driven in synchronism with said motors, said generators each having a voltage characteristic indicative of the angular position of a certain point on the motor shaft with reference to a fixed plane including the axis of the respective motor shaft, an electric discharge device associated with each of said generators and responsive to the voltages generated thereby, said electric discharge devices being connected in series, relay means connected across said serially connected discharge devices and which is adapted to become operative only when simultaneous conduction of both of said pair of discharge devices occurs when a certain angular relation exists between the motor shafts, and switching means operative by said relay means and which is adapted to connect the field winding of the second motor to said source of direct current.

2. In a system of control for a pair of synchronous motors, in combination, a synchronous motor having an armature winding and a field winding, a source of alternating current, means for connecting the armature to the source of alternating current, a source of direct current, means for connecting the field winding to the source of direct current, a second synchronous motor having an armature winding and a field winding, means for connecting the armature winding of the second motor to the source of alternating current, a generator coupled to each of said motors and therefore driven in synchronism with said motors, said generators being of the impulse type, that is having peaked voltage characteristics and each having a voltage characteristic indicative of the angular position of a certain point on the motor shaft with reference to a fixed plane including the axis of the respective motor shaft, an electric discharge device associated with each of said generators and responsive to the voltages generated thereby, said electric discharge devices being connected in series, relay means connected across said serially connected discharge devices and which is adapted to become operative only when simultaneous conduction of both of said pair of discharge devices occurs when a certain relation exists between the motor shafts, and switching means responsive to said third discharge device and which is adapted to connect the field winding of the second motor to said source of direct current.

3. In a system of control for a pair of synchronous motors, in combination, a synchronous motor having an armature winding and a field winding, a source of alternating current, means for connecting the armature to the source of alternating current, a source of direct current, means for connecting the field winding to the source of direct current, a second synchronous motor having an armature winding and a field winding, means for connecting the armature winding of the second motor to the source of alternating current, a generator coupled to each of said motors and therefore driven in synchronism with said motors, said generators being of the impulse type, that is each having a peaked voltage characteristic and having voltage characteristics indicative of the angular position of a certain point on the motor shaft with reference to a fixed plane including the axis of the respective motor shaft, an electric discharge device associated with each of said generators and responsive to the voltages generated thereby, said electric discharge devices being in series circuit relationship, a third electric discharge device which is adapted to become conductive only when simultaneous conduction of both of said pair of discharge devices occurs when a certain relation exists between the motor shafts, and switching means responsive to said third discharge device and which is adapted to connect the field winding of the second motor to said source of direct current.

4. In a system of control for a pair of synchronous motors, in combination, a synchronous motor having an armature winding and a field winding, a source of alternating current, means for connecting the armature to the source of alternating current, a source of direct current, means for connecting the field winding to the source of direct current, a second synchronous motor having an armature winding and a field winding, means for connecting the armature winding of the second motor to the source of alternating current, a generator coupled to each of said motors and therefore driven in synchronism with said motors, said generators each having a voltage characteristic indicative of the angular position of a certain point on the motor shaft with reference to a fixed plane including the axis of the respective motor shaft, an electric discharge device, comprising an anode, grid and cathode, associated with each of said generators and connected in series relationship, said grids being connected to each of the respective generators and having impressed thereon the voltage developed by the respective generator, a third electric discharge device which is adapted to become conductive only when simultaneous conduction of both of said pair of discharge devices occurs when a certain relation exists between the motor shafts, and switching means responsive to said third discharge device and which is adapted to connect the field winding of the second motor to said source of direct current.

5. In a system of control for a pair of synchronous motors, in combination, a synchronous motor having an armature winding and a field winding, a source of alternating current, means for connecting the armature to the source of alternating current, a source of direct current, means for connecting the field winding to the source of direct current, a second synchronous motor having an armature winding and a field winding, means for connecting the armature winding of the second motor to the source of alternating current, a generator coupled to each of said motors and therefore driven in synchronism with said motors, said generators being of the impulse type, that is having peaked voltage characteristics and each having a voltage characteristic indicative of the angular position of a certain point on the motor shaft with reference to a fixed plane including the axis of the respective motor shaft, each of said generators comprising a magnet having an air gap in one of its legs and having a disc like armature coupled to the respective motor shaft and having a pair of diametrically spaced pins which are adapted to pass through the air gap, once for each revolution of the disc like armature, thereby inducing a voltage in the magnet coil, an electric discharge device associated with each of said generators and responsive to the voltages generated thereby, said electric discharge devices being connected in series, a third electric discharge device which is adapted to become conductive only when simultaneous conduction of both of said pair of discharge devices occurs when a certain relation exists between the motor shafts, and switching means responsive to said third discharge device and which is adapted to connect the field winding of the second motor to said source of direct current.

6. In a system of control for a pair of synchronous motors, in combination, a synchronous motor having an armature winding and a field winding, a source of alternating current, means for connecting the armature to the source of alternating current, a source of direct current, means for connecting the field winding to the source of direct current, a second synchronous motor having an armature winding and a field winding, means for connecting the armature winding of the second motor to the source of alternating current, a generator coupled to each of said motors and therefore driven in synchronism with said motors, said generators being of the impulse type, that is having peaked voltage characteristics and each having a voltage characteristic indicative of the angular position of a certain point on the motor shaft with reference to a fixed plane including the axis of the respective motor shaft, each of said generators comprising a magnet having an air gap in one of its legs and having a disc like armature coupled to the respective motor shaft and having a pair of diametrically spaced pins which are adapted to pass through the air gap, once for each revolution of the disc like armature, thereby inducing a voltage in the magnet coil, an electric discharge device associated with each of said generators and responsive to the voltages generated thereby, said electric discharge devices being in series circuit relationship, a third electric discharge device which is adapted to become conductive only when simultaneous conduction of both of said pair of discharge devices occurs when a certain relation exists between the motor shafts, and switching means responsive to said third discharge device and which is adapted to connect the field winding of the second motor to said source of direct current.

7. In a system of control for a pair of synchronous motors, in combination, a synchronous motor having an armature winding and a field winding, a source of alternating current, means for connecting the armature to the source of alternating current, a source of direct current, means for connecting the field winding to the source of direct current, a second synchronous motor having an armature winding and a field winding, means for connecting the armature winding of the second motor to the source of alternating current, a generator coupled to each of said motors, and therefore driven in synchronism with said motors, said generators each having a voltage characteristic indicative of the angular position of a certain point on the motor shaft with reference to a fixed plane including the axis of the respective motor shaft, each of said generators comprising a magnet having an air gap in one of its legs and having a disc like armature coupled to the respective motor shaft and having a pair of diametrically spaced pins which are adapted to pass through the air gap, once for each revolution of the disc like armature, thereby inducing a voltage in the magnet coil, an electric discharge device, comprising an anode, grid and cathode, associated with each of said generators, said grids being connected to each of the respective generators and having impressed thereon the voltage developed by the respective generator, a third electric discharge device which is adapted to become conductive only when simultaneous conduction of both of said pair of discharge devices occurs when a certain relation exists between the motor shafts, and switching means responsive to said third discharge device and which is adapted to connect the field winding of the second motor to said source of direct current.

8. In a system of control for a pair of synchronous motors, in combination, a synchronous motor having an armature winding and a field winding, a source of alternating current, means for connecting the armature to the source of alternating current, a source of direct current, means for connecting the field winding to the source of direct current, a second synchronous motor having an armature winding and a field winding, means for connecting the armature winding of the second motor to the source of alternating current, a generator coupled to each of said motors and therefore driven in synchronism with said motors, said generators each having a voltage characteristic indicative of the angular position of a certain point on the motor shaft with reference to a fixed plane including the axis of the respective motor shaft, each of said generators comprising a magnet having an air gap in one of its legs and having a disc like armature coupled to the respective motor shaft and having a pair of diametrically spaced pins which are adapted to pass through the air gap, once for each revolution of the disc like armature, thereby inducing a voltage in the magnet coil, an electric discharge device, comprising an anode, grid and cathode, associated with each of said generators, said grids being connected to one terminal of each of the magnet windings of the respective generators, a pair of direct current sources of potential, one having its positive terminal connected to the anode of one of said discharge devices and to the cathode of the other discharge device and its negative terminal connected to the other terminal of one of said magnet windings, and other source of direct current potential having its positive terminal connected to the cathode of said other discharge device, a third electric discharge having an anode, grid and cathode, the negative terminal of said last mentioned direct current source being connected to the grid of said third discharge device, a relay in the anode circuit of said third discharge device and which is adapted to become operative only as the result of simultaneous conduction of said first mentioned pair of discharge devices, thereby connecting the field winding of the second motor to said first mentioned direct current source.

FINN H. GULLIKSEN.